United States Patent [19]

Herrington

[11] 4,419,159
[45] Dec. 6, 1983

[54] MANUFACTURE OF PLASTIC BAGS WITH INTERLOCKING PROFILE EXTRUSIONS

[75] Inventor: F. John Herrington, Holcomb, N.Y.

[73] Assignee: Mobil Oil Corporation, New York, N.Y.

[21] Appl. No.: 433,614

[22] Filed: Oct. 12, 1982

Related U.S. Application Data

[63] Continuation-in-part of Ser. No. 365,814, Apr. 5, 1982, Pat. No. 4,392,897.

[51] Int. Cl.³ .................. B29C 24/00; B65D 33/24
[52] U.S. Cl. ................................ 156/66; 24/201 C; 150/3; 156/164; 156/204; 156/244.25; 156/465; 156/499; 156/500; 264/177 R; 264/259; 425/111; 425/113; 428/35; 428/358
[58] Field of Search ............... 150/3, 7; 156/66, 164, 156/244.11, 244.25, 204, 308.4, 465, 500, 229, 227; 229/48 T, 62; 24/201 C; 264/177 R, 259; 425/111, 113; 428/35, 358

[56] References Cited

U.S. PATENT DOCUMENTS

Re. 28,969  9/1976  Naito ............................ 150/3
3,226,787  1/1966  Ausnit .......................... 150/3 X
4,279,677  7/1981  Takahashi ..................... 150/3 X
4,295,919  10/1981  Sutrina et al. ................ 150/3 X
4,306,924  12/1981  Kamp ............................ 156/66
4,341,575  7/1982  Herz ............................. 156/66
4,372,793  2/1983  Herz ............................. 156/66

Primary Examiner—Robert A. Dawson
Attorney, Agent, or Firm—A. J. McKillop; M. G. Gilman; J. F. Powers, Jr.

[57] ABSTRACT

In the manufacture of plastic bags having interlocking profiled extrusions for the closure, the extruded plastic profile is applied to the moving web of film immediately after extrusion of the profile. The temperature of the moving web is maintained such that the profile adheres to the moving web upon contact and thereafter cools to set the thermoplastic in the desired profile. The moving web of film is maintained under tension so that contraction of the film upon release compensates for the contraction of the locking profile as it cools to prevent puckering of the web. The locking profile is applied to the web in an in-line process which includes folding and heat sealing the moving web of film to form plastic bags.

6 Claims, 8 Drawing Figures

MANUFACTURE OF PLASTIC BAGS WITH INTERLOCKING PROFILE EXTRUSIONS

This application is a continuation-in-part of application Ser. No. 365,814, filed Apr. 5, 1982, "Manufacturing Process for Channel Seal," Herrington, now U.S. Pat. No. 4,392,897, which is incorporated by reference herein.

BACKGROUND OF THE INVENTION

1. Field of the Invention

This invention relates to apparatus for and a method of applying locking profile extrusions to a moving web of plastic film during the manufacture of plastic bags from the film.

2. Cross Reference to Related Applications

Application Ser. No. 433,588, filed Oct. 12, 1882, "Plastic Bags With Releasable Closure Which Resists Opening From Inside," Harrington, filed concurrently herewith, discloses and claims the plastic bag which is an example of the article which can be made by the present invention.

3. Description of the Prior Art

Various closure arrangements have been employed for closing plastic bags. U.S. Pat. No. Re. 28,969 Naito shows the Zip-loc storage bag in which a profile extrusion on one side of the bag mates with a profile extrusion on the other side of the bag to form an interlocking, reclosable, closure. The interlocking profiles of this closure are integral with the plastic film of the bag. The extrusion of the interlocking profiles is part of the plastic film making machinery. This adversely affects the speed of the film making machinery. Also, the interlocking profiles preferably extend from a heavier gauge film than would otherwise be required if the locking profiles were not extruded during the film making. This process restricts film gauge reduction which is a significant cost savings in the production of plastic bags. Another disadvantage of extruding the interlocking profiles during manufacture of the plastic film, is that the interlocking profiles must necessarily be of the same resin as the plastic film.

U.S. Pat. No. 3,226,787-Ausnit similarly shows apparatus for extruding the interlocking profiles during the fabrication of the plastic sheet, which adversely affects speed.

U.S. Pat. No. 4,212,337-Kamp shows a closure device made from a heat sealable material. This closure is attached to the heat sealable film in a separate step after the manufacture of the film. Heat is transferred through the film to produce melting at the interface of the film and the closure device to attach the closure to the film. This type of attachment is a slow process which cannot practically be performed in line with the extrusion and bag making. It is not possible to take advantage of in line bag manufacture which includes extrusion, folding, and bag making in a continuous in line process.

In practice the extruded interlocking closures of the prior art are integral with a narrow strip of film which is heat sealed to the plastic film. Making the closure on a separate strip of film for later attachment almost doubles the required amount of plastic material thereby increasing the cost of the bag greatly. These disadvantages are also inherent in other presently practiced manufacturing techniques wherein the closure is separately manufactured and then applied to the plastic film after it has been manufactured. Other techniques of attaching such separate locking profiles to the film include the use of ultrasonic seals which have the same disadvantages.

It is an object of the present invention to extrude locking profiles which are heat sealed to the plastic film during an in line bag manufacturing process.

It is another object of the present invention to provide a plastic bag manufacturing apparatus and process which do not have the aforementioned disadvantages of the prior art and which provide an efficient and economic bag manufacture.

It is another object of the present invention to maintain a temperature differential between a molten thermoplastic extruded locking profile and a moving web of film from which the bag is formed so that the molten thermoplastic adheres to the moving web upon contact and thereafter cools in a manner which prevents puckering of the moving web.

SUMMARY OF THE INVENTION

In accordance with the present invention, a locking plastic profile is extruded and applied to a plastic film. The temperature of the film is maintained warm enough that the interface will reach a temperature at which the materials will fuse together, but cool enough that the film will not distort. Upon cooling, the extruded thermoplastic is set in the desired locking profile.

In accordance with another aspect of the invention, the moving web of film is maintained under tension so that contraction of the film upon release compensates for the contraction of the locking profile as it cools. This prevents puckering of the moving web of film.

The foregoing and other objects, features and advantages of the invention will be better understood from the following more detailed description and the appended claims.

SHORT DESCRIPTION OF THE DRAWINGS

DESCRIPTION OF THE PREFERRED EMBODIMENT

Figure 1:
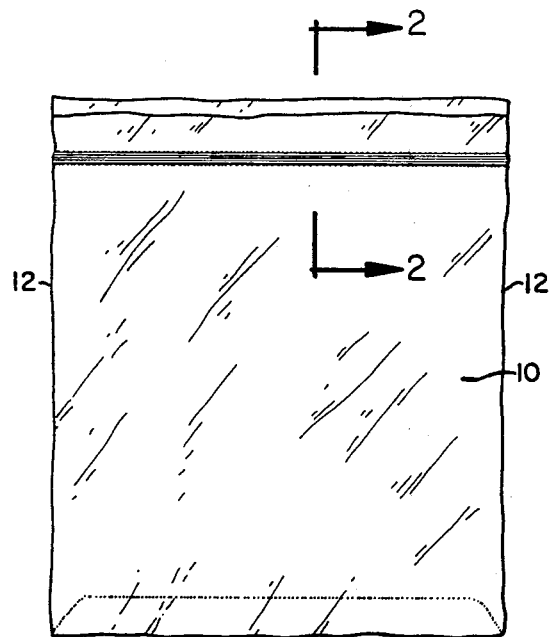
FIG. 1 shows a plastic bag having a locking profile made in accordance with the present invention.
Figure 2:
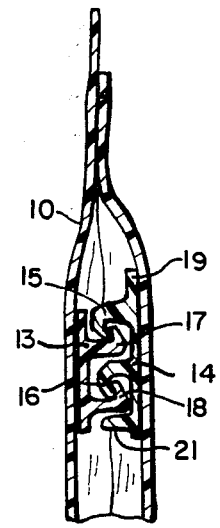
FIG. 2 is a section on the lines 2—2 of FIG. 1 showing the locking profile in more detail.
Figure 3:
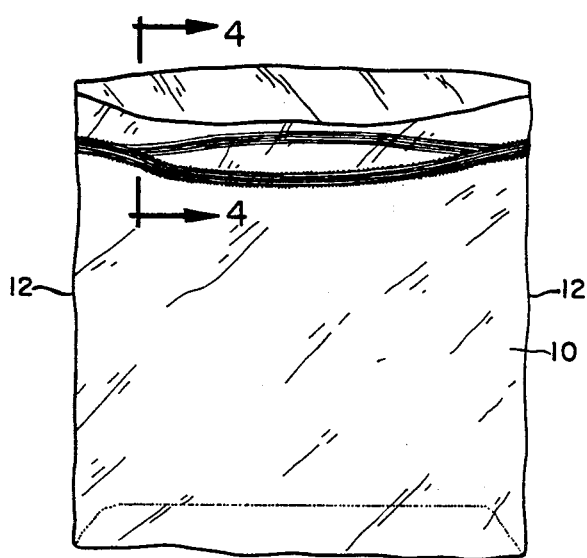
FIG. 3 shows the plastic bag with the closure partially open.
Figure 4:
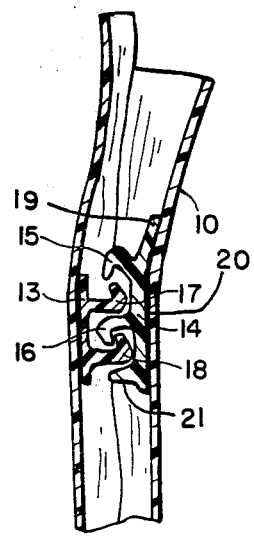
FIG. 4 is a section on the line 4—4 of FIG. 3.

Referring to FIGS. 1-4 a plastic bag 10 is formed from a thin, plastic film which is folded at the bottom 11 and is heat sealed along the sides 12 to form a pouch. Locking profiles 13 and 14 along the inside of the top of the bag form a reclosable closure. Each of the locking profiles includes locking protrusions such as 15, 16 and 17, 18. These hook shaped protrusions mate to lock the closure when they are pressed together. The protrusions are flexible so that the locking closure can be easily separated and then reclosed.

As more fully disclosed and claimed in my concurrently filed application, the closure includes a fin 19 which extends toward the outside of the bag on the side extending away from the hook on the locking protrusion 15. When the layers of film are pulled apart from outside the bag, the fin 19 provides leverage which bends the hook outwardly, releasing it from the adjacent hook on protrusion 17. The profile 14 has a "weak point" at 20 which allows deflection so that the locking protrusion 15 can move outwardly. This leverage does not exist when force is exerted to pull the film apart from inside the bag.

The optional vertical extension 21 at the bottom end of the profile 14 holds the locking protrusion 15 so that it cannot release under force from inside the bag. In this manner, the bag tenaciously resists opening by the contents from inside the bag but it opens easily by hand from the outside.

The protrusions 15 and 16 extend from a common base and the protrusions 17 and 18 extend from a common base. The protrusions are uniform with the hooks on protrusions 15 and 16 extending in one direction and the hooks on protrusions 17 and 18 extending in the other direction. These profiles are easily extruded and applied to the plastic film forming the bag in an in-line manufacturing process.

Figure 5:
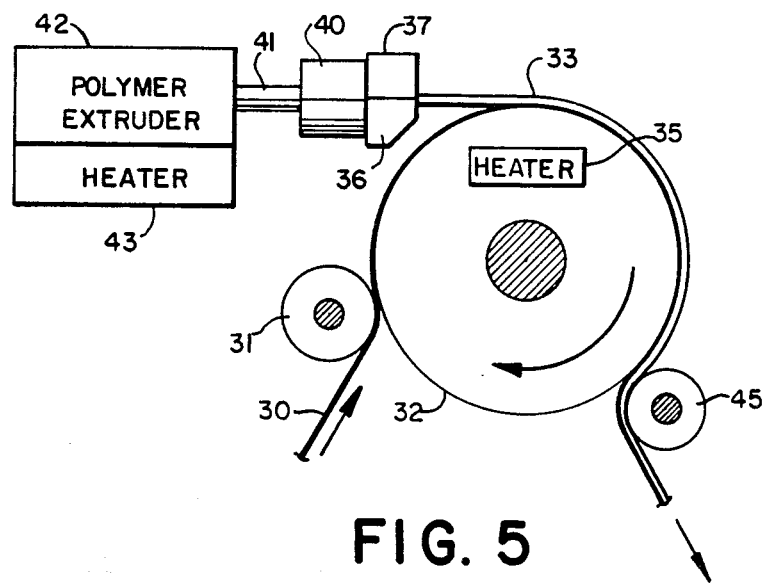
FIG. 5 is a diagrammatic drawing of the apparatus of the present invention.
Figure 6:
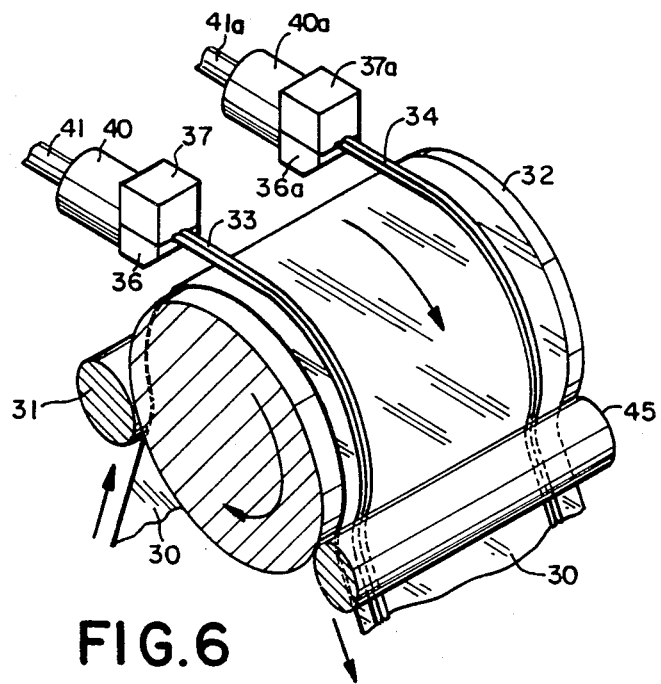
FIG. 6 shows the extruding assembly.
Figures 7, 8:
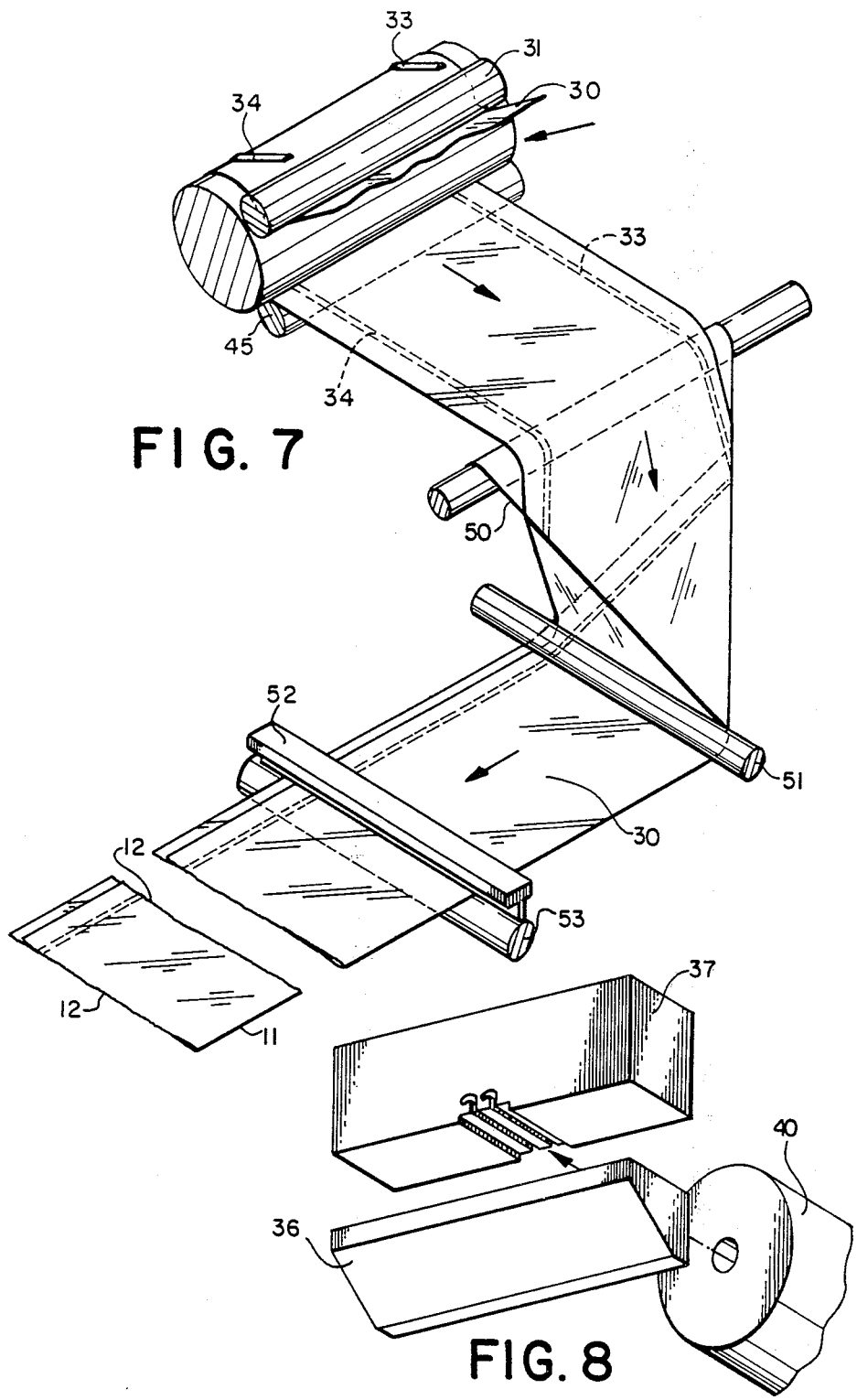
FIG. 7 is a perspective view of the bag forming apparatus in accordance with the present invention.
FIG. 8 shows the extrusion die in more detail.

Apparatus in accordance with the present invention for making these bags is shown in FIGS. 5-7 which depict a continuous web of a thermoplastic film 30, e.g., polyethylene, moving between first nip roll 31 and a backup roller 32. As film 30 passes over back up roller 32 it is contacted by profile extrusions 33 and 34 (FIG. 6). The film passes between back up roller 32 and a second nip roller 45 and on to further processing, including heat sealing of the bag sides.

Two extruding assembiles are positioned adjacent to backup roller 32 and moving film 30 to apply the profile extrusions 33 and 34 to the moving film 30 on the side of the film opposite first or backup roller 32. Each extruding assembly comprises a feed block 40, 40a and profile extrusion die blocks 36 and 37, and 36a and 37a. Die blocks 36 and 37 are connected to the feed block 40 which is fed through pipe 41 by a source of molten thermoplastic, shown in FIG. 5 as a polymer extruder 42 with a heater 43. A heater 35 (FIG. 5) is used to maintain backup roller 32 at a desired temperature. This maintains the temperature of the moving web of film warm enough that the interface with the extrusion is at a temperature at which the materials fuse together. To make the profile adhere to the film, it is necessary to have a sufficiently high temperature where they join together. The temperature must be cool enough that the film will not distort. This is achieved by the proper combination of molten thermoplastic temperature and backup roller temperature. The backup roller must be sufficiently cool to prevent distortion of the film where it contacts the hot channel. It has been found that when the backup roller 32 is maintained at a warmer temperature, the required molten thermoplastic temperature is lower. A satisfactory operation has been achieved with a molten polyethylene temperature of 300° F. and a backup roller temperature of 140° F. at a film speed of 32 ft. per minute for 1.3 mil film. Both the film and the extrusion comprised low density polyethylene.

In order to maintain the moving web of film 30 under tension when the strip is being applied, first nip roller 31 and second nip roller 45 press the film 30 against the backup roller 32. The backup roller 32 is adjusted at a preselected tension to remove any ripples that may occur in the film 30. It is necessary to tension the film at the point where the profile joins it in order to avoid distortion or puckers. If the film tension is low, then in the final product the film is puckered along the channel. This is caused by shrinking of the profile as it cools. Applying tension to the film stretches it elastically, so that when it is released it contracts. If the amount of tension is proper, the contraction will be the same as the shrinking of the profile and the product will be smooth. If there is too much tension, then the film will try to contract more than the channel shrinks, and the channel will be rippled in large bends.

FIG. 7 shows the apparatus of the present invention in an in-line manufacturing process for making plastic bags. After leaving the extruding assembly, the film 30, having the extruded profiles 33 and 34 attached thereto, passes over triangular board 50 which is part of a center folder. After passing the roller 51, the film is folded with the profiles 33 and 34 on the mating, inside surfaces of the film. The film must be guided carefully so that the profiles will mate exactly when they join.

A heated foot squeezes the zipper in a localized area to close it. Hot seal bar 52 presses the film against back up roll 53 to seal the sides of the bag and detach the bags. One bag has been shown detached at the end of the roll in FIG. 7, the bottom 11 and sides 12 being indicated.

FIG. 8 shows an extruding assembly including a feed block 40 and a shaping portion including upper die block 37 and lower die block 36. Resin flows through the opening in feed block 40 and is extruded through the profile shape in the upper die block 37. This profile shape is cut into upper die block 37. One expedient way to cut this shape is by wire EDM (electric discharge machining). Like a jigsaw, the wire moves along its axis slowly. The block moves in a programmed path to cut the desired shape.

While a particularly embodiment of the invention has been shown and described, various modifications are within the true spirit and scope of the invention. The appended claims are, therefore, intended to cover all such modifications.

What is claimed is:

1. Apparatus for attaching locking profile extrusions to a plastic film comprising:
   means for moving a web of said film;
   an extruding assembly positioned adjacent to said moving web comprising first and second means for extruding first and second locking plastic profiles and means for supplying molten thermoplastic to said extruding assembly;
   means for maintaining the temperature of said moving web sufficiently high so that said profiles adhere to said moving web upon contacting and thereafter cool to set said thermoplastic in said profiles; and
   means for maintaining said moving web under tension about a cylindrical roller including a first nip roller for biasing said moving web against said cylindrical roller prior to said moving web coming into contact with said profiles and a second nip roller for biasing said moving web against said cylindrical roller after said profiles come into contact with said moving web, so that contraction of said film upon release compensates for the contraction of said profiles as said profiles cool to prevent puckering of said moving web.

2. The apparatus recited in claim 1 further comprising:
   means for folding said plastic film so that the first locking profile mates with said second locking profile; and means for heat sealing the two folded layers of said plastic film along lines extending across the width thereof and at successive positions along the length of said film to form bags closed by said heat sealed lines along two sides, closed by the folded plastic film at the bottom, and having an opening at the top, which is closable by said locking profiles.

3. The apparatus recited in claim 1 wherein each of said means for extruding includes:
an extrusion die having an opening for extruding a base and a plurality of openings extending therefrom for extruding hook shaped protrusions extending from said base.

4. A method of attaching locking profile extrusions to a plastic film comprising:
moving a web of said film past an extruding assembly;
extruding from said extruding assembly first and second locking plastic profiles of molten thermoplastic onto said moving web;
maintaining the temperature of said moving web sufficiently high so that said profiles adhere to said moving web upon contacting and thereafter cool to set said thermoplastic in said profiles; and
maintaining said moving web under tension about a cylindrical roller with a first nip roller for biasing said moving web against said cylindrical roller prior to said moving web coming into contact with said profiles and with a second nip roller for biasing said moving web against said cylindrical roller after said profiles come into contact with said moving web, so that contraction of said film upon release compensates for the contraction of said profiles as said profiles cool to prevent puckering of said moving web.

5. The method recited in claim 4 further comprising:
folding said plastic film so that the first named locking profile mates with said second locking profile; and
heat sealing the two folded layers of said plastic film along lines extending the width thereof and at successive positions along the length of said film to form bags closed by said heat sealed lines along two sides, closed by the folded plastic film at the bottom, and having an opening at the top which is closable by said locking profiles.

6. The method recited in claim 4 wherein said film is approximately 1.3 mil polyethelene moving at a speed of about 32 ft. per minute, said molten thermoplastic is polyethylene at a temperature of about 300° F., and the temperature of said film is maintained by a back up roller at about 140° F.

* * * * *